United States Patent [19]

Rothstein

[11] Patent Number: 4,646,816
[45] Date of Patent: Mar. 3, 1987

[54] SIMPLIFIED TUBE PLUGGING

[76] Inventor: Samuel Rothstein, 79-19 269th St., New Hyde Park, N.Y. 11040

[21] Appl. No.: 875,234

[22] Filed: Jun. 13, 1986

Related U.S. Application Data

[63] Continuation of Ser. No. 773,834, Sep. 6, 1985, abandoned, which is a continuation of Ser. No. 618,762, Jun. 11, 1984, abandoned, which is a continuation of Ser. No. 507,934, Jun. 23, 1983, abandoned, which is a continuation of Ser. No. 370,987, Apr. 22, 1982, abandoned.

[51] Int. Cl.$^4$ ................... F16L 55/12; B23P 19/02
[52] U.S. Cl. .................................. 165/76; 29/157.4; 138/189
[58] Field of Search ............. 29/523, 525, 157.4; 138/89; 165/76, 137; 215/279, 358, 360; 220/237; 411/40, 41, 44, 49, 55

[56] References Cited

U.S. PATENT DOCUMENTS

| | | | |
|---|---|---|---|
| 2,764,184 | 9/1956 | Fitzhugh et al. | 138/89 |
| 2,937,666 | 5/1960 | Maisch | 138/89 |
| 3,525,365 | 8/1970 | Meulendyk et al. | 138/89 |
| 3,691,609 | 9/1972 | Ice, Jr. et al. | 138/89 X |
| 4,048,898 | 9/1977 | Salter | 411/44 |
| 4,113,006 | 9/1978 | Clapp | 138/89 X |
| 4,290,543 | 9/1981 | Larson | 165/76 X |
| 4,303,101 | 12/1981 | Thalen | 138/89 X |
| 4,390,042 | 6/1983 | Kucherer et al. | 29/523 X |

FOREIGN PATENT DOCUMENTS

| | | | |
|---|---|---|---|
| 0677328 | 6/1939 | Fed. Rep. of Germany | 138/89 |
| 0698554 | 11/1940 | Fed. Rep. of Germany | 411/44 |
| 0864787 | 1/1953 | Fed. Rep. of Germany | 138/89 |
| 2031129 | 12/1971 | Fed. Rep. of Germany | 411/55 |
| 1379461 | 10/1964 | France | 411/44 |
| 1560445 | 7/1969 | France | 411/49 |

Primary Examiner—Stephen Marcus
Assistant Examiner—Mark Thronson
Attorney, Agent, or Firm—Brooks Haidt Haffner & Delahunty

[57] ABSTRACT

Tube plugs in several embodiments are provided for plugging and sealing off a defective tube in a heat exchanger to effect a seal at a location within the tube, spaced away from the tube end. The tube plug includes a deformable cylindrical sleeve member which is placed into the tube end, and has a peripheral shoulder thereon which abuts against the tube end to position an interior tapered portion of the sleeve, adjacent to its other open end, at the desired location of the seal to be formed within the tube, and a hard plug member, having a comating tapered portion, which is either hammered into the sleeve or tightened and pulled outwardly depending upon the direction of the engaging tapered surfaces, to deform the sleeve and form the tube seal in the zone of the tapered surfaces.

11 Claims, 11 Drawing Figures

SIMPLIFIED TUBE PLUGGING

This application is a continuation of application Ser. No. 773,834 filed Sept. 6, 1985, now abandoned, which is a continuation of prior application Ser. No. 618,762 filed on June 11, 1984, and now abandoned, which was a continuation of prior application Ser. No. 507,934, filed on June 23, 1983, and now abandoned, which was a continuation of prior application Ser. No. 370,987, filed on Apr. 22, 1982, and now abandoned.

FIELD OF THE INVENTION

This invention relates to techniques for sealing off defective tubes in tube-type heat exchangers, such as steam generators, condensers, and the like. More particularly, the invention relates to tube plugging devices for such use.

BACKGROUND OF THE INVENTION AND THE PRIOR ART

A leaky tube in a tube-type heat exchanger, such as a steam generator, feedwater heater, condenser, or the like, permits contamination of the fluid on either the tube side or the shell side of the heat exchanger, permits loss of pressure, and reduces the efficiency of the heat exchanger. A number of techniques and different types of tube plugs are available to plug defective heat exchanger tubes, but these have been deficient in one or more respects. For example, some are ineffective to produce a leak-tight seal where there are irregularities in the tube surface on or immediately adjacent to the open end of the tube which is to be plugged, such as might be due to corrosion, or when there has been weld build-up or a deposit of weld splatter on the tube when it was initially installed. Other tube plugging devices may damage adjacent tubes, or the tube sheet ligaments between the tubes, by requiring or permitting excessive pressure to be applied as the plug is installed, sometimes causing more leaks than they correct. Still others are difficult to install, especially while working in the tight quarters and other adverse environmental circumstances of a boiler or heat exchanger, such that the tube plugging operation cannot be conducted rapidly and effectively.

Probably the best of the prior art tube plugging devices utilizes a deformable cylindrical bushing or sleeve member which is pressed into contact with the interior tube surface immediately adjacent to the tube end by a relatively hard plug member, which expands the sleeve when forced into it, the plug member then being left within the sleeve and becoming a part of the plug. Usually, the deformable sleeve or bushing member has a tapered interior surface against which a correspondingly tapered outer surface of the plug member presses as the plug member is forced in axial direction against the radially expandable sleeve member. Examples of such devices are disclosed in U.S. Pat. Nos. 3,156,373, 3,525,365, 3,983,904 and 4,091,841. A similar form of sleeve-type plug is the "Elliot" plug, which utilizes a tapered pin forced into a tapered sleeve having an external peripheral shoulder thereon which positions the sleeve against the open end of the tube. The "Elliot" plug effects a seal substantially within the plane of the tube end. Similar devices, but in which only the plug members are tapered, are shown in U.S. Pat. Nos. 4,114,654 and 4,170,247.

The use of such a deformable sleeve as part of the plug represents an improvement over a tapered pin plug, which does not employ such a sleeve and which also continues to be used. However, when either the plain pin plug or any of these prior sleeve-type plugs is used, an acceptable seal is not always provided where the pin or the sleeve is disposed at or adjacent to a tube end having the aforementioned irregularities in its surface, due to the effects of corrosion, weld build-up or splatter, etc. The irregular surface provides interstices between the interior end surface of the tube and the plug when the latter is pressed therein. Thus, the pitting effects of corrosion, and excess weld material on and adjacent to the mouth of the tube must usually be removed by drilling, filing, or reaming in advance of placement of the plug, to permit the plug to seal within the tube end.

Another significant disadvantage of any plug which is placed and driven home at the end of a tube is that any weld spillover at the mouth of the tube will also cause unevenness of driving pressures, with possible resulting distortion of the tube sheet ligaments as the pin is hammered or otherwise tightened. This frequently results in leaks, not only in the seal being formed, but in the adjacent tube to tube sheet joints. Moreover, such plugs are difficult to tighten within the funnel-shaped tube end, and sometimes drop out.

Explosive tube plugs such as shown in U.S. Pat. No. 3,555,656 are also known, these comprising a closed end, hollow metal nipple containing a controlled amount of explosive. Positioned within the mouth of the tube, its detonation swells the nipple, pressing it radially outward against the tube interior at a location spaced inwardly from the tube end. However, such plugs are dangerous in that handling of "live" explosives is required, and exact control of the pressure exerted on the tube is not attainable. Over-expansion of the nipple by an enlarged explosive charge causes distortion of the adjacent tube sheet ligaments, possibly resulting in leaks at adjacent tube joints.

By contrast, the present invention provides a plugging technique which is effective to develop a leak-tight seal without danger of damage to adjacent tubes or tube to tube sheet joints, and in which the plug can be effectively installed in a rapid manner working within the hostile environment of a heat exchanger where temperature and space limitations create poor working conditions. Moreover, the present invention provides a means whereby a pug may be installed at any desired location along the length of the heat exchanger tube, although it is preferable that the tube be plugged within the length of the tube sheet because the tube can then be "pinched" between the expanded plug and the tube sheet to ensure an effective seal.

Further, using the present invention, weld build-up at the mouth of the tube as well as deposited weld splatter material on the inside surface of the tube at or near its mouth can usually be ignored, and therefore need not be removed prior to plugging the tube. Another advantage of the plugging device to be described is that it is possible to control, and thereby to limit the amount of expansion of the plug sleeve, thus eliminating the possibility for damage to adjacent tube sheet ligaments or to adjacent tubes. Further, because of the controlled amount of expansion of the plug sleeve member as is attained by the present invention, it is generally not necessary to consider the relative coefficients of expansion of the plug, the tube, and the tube sheet as is ordinarily the case when installing previously known plugs, because thermal expansion changes will be small as compared with the mechanical expansion of the plug.

Another advantage of the present invention is that a sleeve and plug of a given size can be used to plug any conduit of the same nominal size because, upon installation, the plug will accommodate any normal manufacturing tolerance variation in the interior diameter of the tube.

BRIEF DESCRIPTION OF THE INVENTION

Briefly describing the present invention in its preferred embodiments, the tube plug is formed by an elongated, deformable metal sleeve or bushing member, which is open at both ends and has a straight cylindrical outer surface, and a peripheral shoulder at its outer end. Its interior wall surface includes both a tapered surface portion and a straight cylindrical portion. A pin or plug member of metal material having the same or greater hardness, fits into the sleeve member and has a tapered exterior surface portion which presses against and radially expands the sleeve as the plug member is hammered or otherwise tightened in the axial direction within the sleeve. The straight cylindrical interior surface portion of the sleeve member extends inwardly from the outer end of the sleeve formed by the aforementioned outward projecting peripheral shoulder or flange which will be seated against the tube end as the plug is formed, its purpose being to position and retain the interior tapered surface portion of the sleeve at the desired location within the tube. Thus, depending upon the length of the sleeve member, or by adding a similar cylindrical locating sleeve member, the plug seal can be disposed at any location within the length of the tube, although it is preferably formed within the tube length corresponding to the thickness of the tube sheet of the heat exchanger, for purposes as will be described. Similarly, the plug member includes a straight, preferably cylindrical body portion which projects exteriorly of the tube end, for driving or applying tightening pressure on the plug.

The comating tapered surface portions of the sleeve and plug members have the same angle of taper for uniform application of pressure, and to form a secure taper fit. The preferred taper of 1 to 20 (one unit of flare for 20 units of length) facilitates driving of the plug member, extends the length of the seal, and limits the amount of radial expansion of the sleeve member to avoid damage to adjacent ligaments and tubes. If working conditions at the tube sheet face are such that the plug member is more easily hammered into place, the narrowing direction of the taper is towards the tube interior. If there is insufficient room to permit swinging of a hammer, the direction of the taper is reversed, so that the narrow end of the taper faces outwardly of the tube, and the plug sealing pressure is applied by pulling on the projecting outer end of the plug member, as by threaded-tightening, or hydraulic or mechanical pulling, as will be described.

DETAILED DESCRIPTION OF PREFERRED EMBODIMENTS

These and other objects, features and advantages will become apparent from the following detailed description of presently preferred embodiments of the invention, reference being made to the accompanying drawings, in which.

Figure 1:
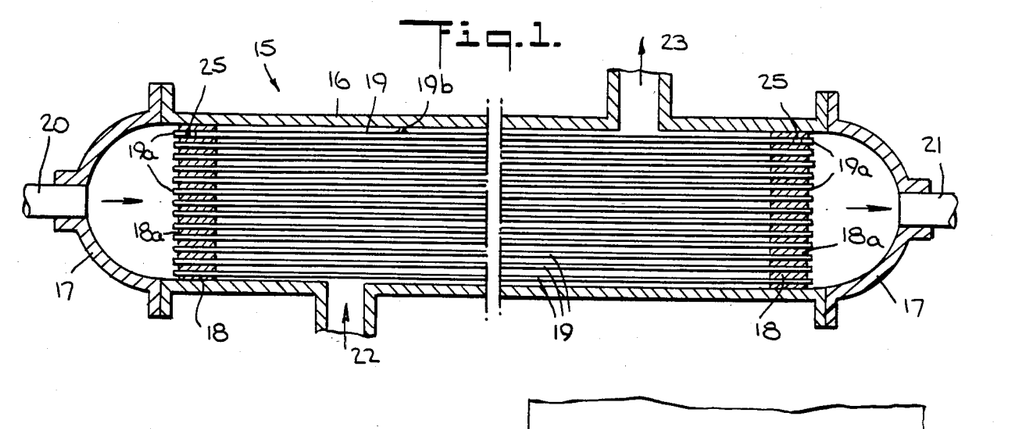
FIG. 1 is a fragmentary sectional view of a tube-type heat exchanger, having a defective tube therein which is plugged in accordance with the invention.

Referring to the drawings, FIG. 1 shows a typical tube-type heat exchanger 15 formed by a tubular outer shell 16, head covers 17 at each end, and relatively thick metal tube sheets 18 between which the heat exchanger tubes or conduits 19 extend in well-known manner. Also as generally understood, tube sheet ligaments 18a are those portions of the tube sheet 18 which are disposed between the respective tubes 19 themselves. The tube ends 19a are welded to the tube sheets 18. In a typical heat exchanger, fluid to be heated enters through an inlet 20 and, after passing through the tubes 19a, is discharged through the heater outlet 21. The heat exchange fluid on the shell side of the tubes 19 enters the heat exchanger through an inlet 22, passes around the tubes 19, and is discharged through an outlet 23, also in well-known manner. The heat exchange tubes 19 are made of steel or other appropriate metal, and each may be 20-feet to 50-feet long and have an inside diameter of from as small as one-half inch in smaller heaters to as much as two inches, or sometimes larger, in large heat exchangers.

Should any of the tubes 19 become defective, it is apparent that the fluid flowing through the tubes 19 may become contaminated with the heat exchange fluid flowing past the shell side of the tubes. If there is a pressure difference between the two sides of the tubes 19 as is usually the case, a loss of pressure will be experienced on the higher pressure side. Of course, techniques are presently available for detecting a tube which, though not yet leaking, is in imminent danger of becoming a leaky tube upon further heater operation.

FIG. 1 diagramatically indicates such a leakage defect 19b in one of the tubes 19. As is well known, any attempt to remove and replace such a defective tube is a virtual impossibility without extensive dismantling of the heater 15 itself and, therefore, the common expedient is to merely remove such defective tube from service by plugging both of its ends 19a so that the fluid to be heated will no longer pass therethrough. FIG. 1 shows the defective tube as having been plugged at each of its ends by respective tube plugs 25 in accordance with the present invention, for such purpose. The tube plugs 25 are fully sealed within the defective tube, and effectuate its isolation from the heat exchange operation. The fully formed tube plug 25 is illustrated in enlarged scale in FIG. 4.

Figure 4:
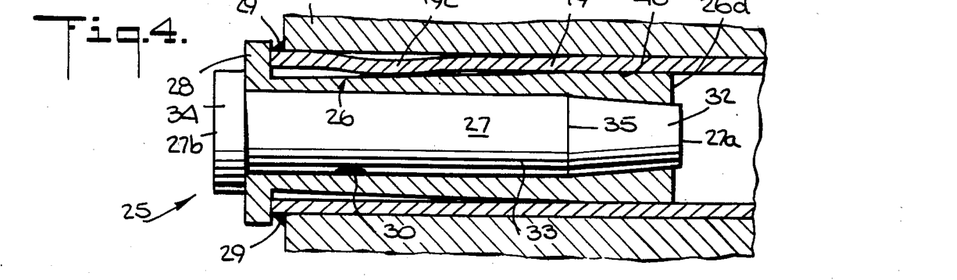
FIG. 4 is a similar view of the same tube having the now fully sealed plug therein.

Referring briefly to FIG. 4 which shows one presently preferred embodiment of the invention, it will be understood that the apparatus 25 for plugging a tubular conduit such as the defective tube 19 in FIG. 1 includes a generally cylindrical sleeve member 26, and a plug member 27 which is wedged tightly within the cylindrical sleeve member 26 when the seal is fully formed.

Figure 2:
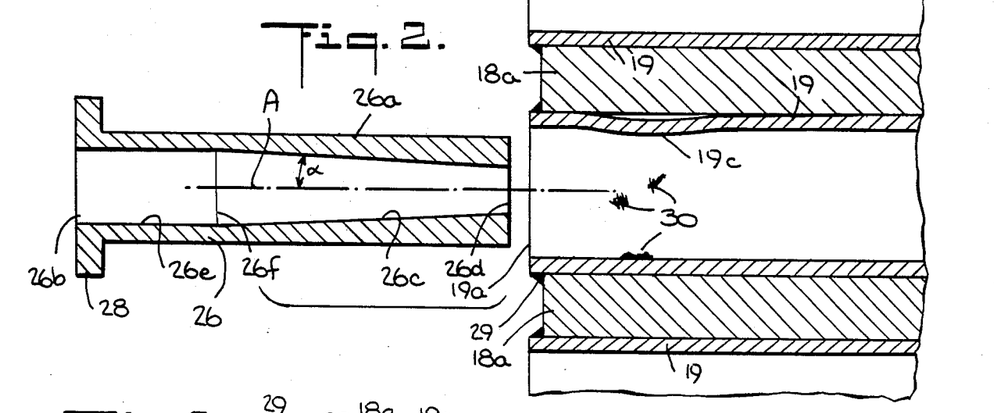
FIG. 2 is an enlarged and fragmentary sectional view of one end of the defective tube of the heat exchanger shown in FIG. 1, to illustrate a first step in plugging the tube in accordance with one embodiment of the invention.
Figure 3:
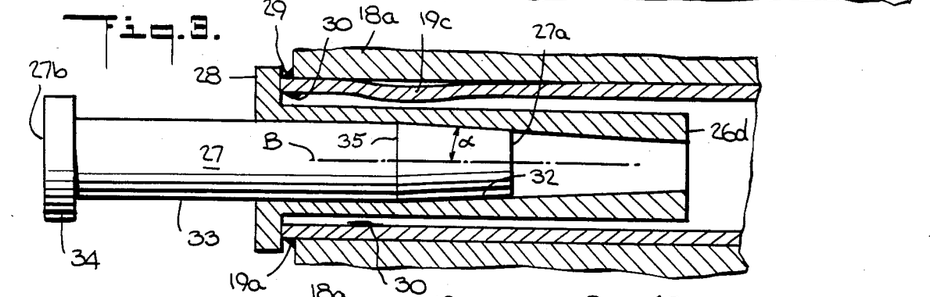
FIG. 3 is a similar fragmentary sectional view of the tube in FIG. 2 as it would appear at an intermediate stage of the tube plugging procedure.

Referring now to FIG. 2, the cylindrical sleeve member 26 is made of deformable metal material such as annealed, ductile stainless steel, or possibly carbon steel, or copper-nickel alloy depending upon environmental circumstances, such that it will deform by expanding radially into tight fitting engagement with the interior surface of the tube in response to the ordinarily anticipated force of a hammer blow or the like, applied when the plug is being set as will be described. The bushing or sleeve member 26 initially has a straight cylindrical outer surface portion 26a whose diameter is nominally the same as the inner diameter of the tube 19 to be slidably received within the latter. With reference to the direction of insertion of the sleeve member within the tube 19, the rearward or outer open end 26b thereof has a radially outward projecting, peripheral flange 28 which abuts or seats against the tube end 19a when the sleeve member is positioned within the tube 19, as seen in FIGS. 3 and 4. Referring again to FIG. 2, the sleeve member 26 has an interior wall surface which includes a tapered length portion 26c which extends inwardly from the opposite open end 26d of the sleeve member, and an integrally formed straight cylindrical length portion 26e which extends from the open end 26b and conjoins with the tapered length portion 26c along the circular line of intersection 26f. In the preferred embodiment, the taper angle ratio is 1 to 20 with reference to the imaginary longitudinal axis A of the sleeve member 26.

The length and shape of the tapered length portion 26c should remain substantially the same, regardless of the desired length of the sleeve member 26 which may be varied.

Thus, the length of the sleeve member 26 and of the interior straight cylindrical length portion 26e determines the location of placement of the tapered length portion 26c within the interior of the tube 19 to be plugged which, in turn, determines the location of the seal to be formed within the length of the tube 19 extending inwardly from its open end 19a. This positioning of the location of the plug seal at a distance inwardly from the open end 19a of the tube 19 is an important aspect of the present invention in that the seal is formed at an interior location which is relatively free from tube distortions, such as the tube distortion 19c, or of the buildup 29 of weld material, or of the weld splatter 30, any or all of which may have been formed or deposited when the tube 19 was initially placed and welded within a tube aperture of the tube sheet 18. Preferably, the location of the seal will be within the thickness of the tube sheet 18, which thickness may be from 2-inches to 3-inches in low pressure heaters, and from 9-inches to 12-inches in high pressure heaters. However, the seal can be formed at any location within the tube 19. Thus, although the illustrated embodiment indicates that the interior cylindrical portion 26e may have short length, it will be understood that its length might be relatively long.

As an example of the sizing of the sleeve member 26 for use with a nominally ⅝" diameter tube 19, the material would be stainless steel, sold under the trademark "Cosmic", which is a ductile, readily deformable AISI-304 material. Its hardness would be 90 on the Rockwell "B" scale. The overall length of the sleeve 26 is 1⅞", and the diameter of its outer cylindrical surface 26a is 0.445" which, when crushed, will expand to approximately 0.475" in diameter. The outside diameter of the shoulder 28 is ¾" to ensure that it seats against the tube end 19a, but does not extend unduly therebeyond across the tube sheet ligaments 18a, as might cause interference with a plug placed in an adjacent tube 19. Considering that this sleeve member 26 will be deformed by hammering the plug member 27 therein, the length of its interior tapered wall portion 26c is 1¼ inches, and the length of the straight cylindrical portion 26e from the end 26b to the line of conjunction 26f with the tapered portion, is ⅝". The diameter of the cylindrical bore 26e is 0.335", and the diameter of the open end of the tapered length portion 26c, at the open end 26d, is 0.210". Thus, the wall thickness of the sleeve member 26 within the cylindrical length portion 26e is 0.055", which permits easy deformation of the sleeve member, yet is strong enough to avoid rupture by tension forces during placement of the plug.

With reference to the exterior diameter 26a of the sleeve member 26, it is sized to fit within the smallest acceptable interior diameter of the tube 19, within the normally contemplated range of tolerance variation due to manufacture, with allowance also being made for effective reduction of that diameter by weld deposits at or near the mouth of the tube, distortions at the interior of the tube, etc. Thus, for example, a typical ⅝" diameter, 14-gauge tube may have an inside diameter measuring anywhere from 0.4465" to 0.4815" as received from the the manufacturer. When the tube is installed in the tube sheet 18, it is roll-expanded to fit tightly therewithin, and this rolling operation can add 0.010" to both the maximum and minimum dimensions of the tube. Accordingly, the diameter of the exterior cylindrical surface 26a of the sleeve member 26 is selected, not only to provide clearance for weld splatter, denting, etc. on the interior of the tube, but such that the sleeve member will achieve a seal with the interior surface of the tube 19 along a substantial length of the tapered length portion 26c, even when the tube 19 has the largest possible diameter, and even if the plug member 27 must be driven almost completely into the sleeve member 26.

Referring now to the comating plug member 27 as illustrated in FIGS. 3 and 4, it has a relatively short tapered length portion 32 extending from the inner end 27a thereof, and a straight cylindrical portion 33 which extends from a projecting head 34 on its outer end 27b to the line of its conjunction 35 with the tapered exterior length portion 32. The head 34 is to receive the forces of hammer blows on the plug member 27, as the plug is placed and the seal is formed within the tube 19.

The material and dimensions of a typical plug member 27 to be used with the aforementioned sleeve member 26 for plugging a nominally ⅝" diameter heater tube, are selected for ease of deformation of the sleeve member and rapid placement of the plug. The plug material is chosen for its corrosion resistance, machinability and cost. Its hardness is such as to ensure that the plug member 27 does not itself deform, but that the sleeve member 26 will readily expand. A preferred material is an AISI-1018 steel sold under the trademark "Versalloy", having a Rockwell "C" hardness of from 25 to 30. The length of its tapered length portion 32 is $\frac{1}{2}$", as compared with the $1\frac{1}{4}$" length of the interior tapered length portion 26c of the sleeve member on which it will act. As previously mentioned, the angle $\alpha$ of its taper is preferably identical to that of the sleeve member portion 26c, i.e., a 1 to 20 taper ratio, with reference to the imaginary axis B of the plug member 27. The overall length of the plug member 27 is 2", including the $\frac{1}{2}$" length of its tapered length portion 32, and the $\frac{1}{8}$" thickness of its flange head 34. Thus, the length of its straight cylindrical portion 33 is $1\frac{3}{8}$". The diameter of the portion 33 is 0.325", which provides a slidable fit within the 0.335" interior diameter of the sleeve member cylindrical bore portion 26e. The diameter of the inner end 27a, at the end of the tapered length portion 32, is 0.275". Accordingly, when the sleeve member 26 is positioned within the tube end 19a and the plug member 27 is slidably received therein ready for forming the plug seal, the plug member 27 projects outwardly from the sleeve member shoulder 28 a substantial distance, as shown in FIG. 3.

To seal off the end of the defective tube 19 as seen in FIG. 2, the sleeve member 26 is first slidably placed therein with its shoulder 28 against the tube end 19a as illustrated in FIG. 3, and it will be noted that its tapered length portion 26c extends a distance inwardly from the mouth end 19a of the tube, so that the seal which will be formed will also be disposed at a distance of 1" or more away from the mouth end 19a, within the tube 19. Thus, the seal will be formed beyond the locations of most tube distortions such as shown at 19c, weld splatter material as indicated by reference numeral 30, weld buildup material 29, and corrosion distortions, etc. at or near the mouth end 19a of the tube. The hardened plug member is then placed therein as shown in FIG. 3 whereupon, using a hammer (not shown), the plug member 27 is driven to refusal within the sleeve member 26. The relative diameters of the plug 27 and sleeve member 26 are preferably such that, when refusal is reached, the head 34 of the plug member will be substantially against the flange or shoulder 28 of the sleeve member, as illustrated in FIG. 4. As also seen in FIG. 4, a leak-proof peripheral seal 40 is formed upon deformation of the sleeve member 26 adjacent to its inner end 26d, the seal 40 extending an axial distance substantially corresponding to the length of the tapered length portion 32 of the plug member 27. Thus, an effective seal is formed at an interior location within the tube 19, rather than at its outer end, bypassing irregularities such as deformation 19c, weld splatter 30, etc. which would cause an ineffective seal to be made. The aforementioned relative diameters of the plug and the sleeve are such as to limit the expansion of the sleeve member 26, to permit a seal without damage to adjacent tubes or ligaments by overexpansion of the sleeve member 26.

The preferred taper of 1 to 20 facilitates the driving of the plug member 27 into the sleeve member 26 to expand it. That is, a steeper angle would require more force, but less distance of travel of the plug member 27, thereby reducing the length of the sealing area 40. Further, the taper angle of the plug member portion 32 is equal to the taper angle of the interior taper portion 26c of the sleeve member, not only to ensure tight fit, but to ensure that an adequate seal is formed between the plug member 27 and the sleeve member 26 themselves, along an area of significant length, rather than over a short length area as might permit leakage therebetween. Regarding the material of which the plug member is made, although it is preferably of harder material than the sleeve member 26, it may also be of the same material, and therefore have the same hardness as the sleeve member 26. Of course, the plug member 27 must not be of a softer material than the sleeve member 26.

Referring now to an alternative embodiment of the invention as illustrated in FIGS. 5-8, such is used where there is insufficient room for a workman to swing a hammer to drive home the plug member 27 as described in connection with the previous embodiment. Instead, the alternative embodiment is intended to permit the application of tensile force on the plug member to radially expand the sleeve member to form a similar seal in any defective tube 19. In the illustrated embodiment, such force is applied by a wrench acting on a threaded nut to provide the required pulling force to deform the sleeve member, but it should also be understood that the plug member may be adapted to be pulled by any appropriate electrical, mechanical, or hydraulic pulling device (not shown) which may be conveniently used within the confines of the heat exchanger head area to exert the required amount of pulling force on the plug member, all as will be understood.

Figure 5:
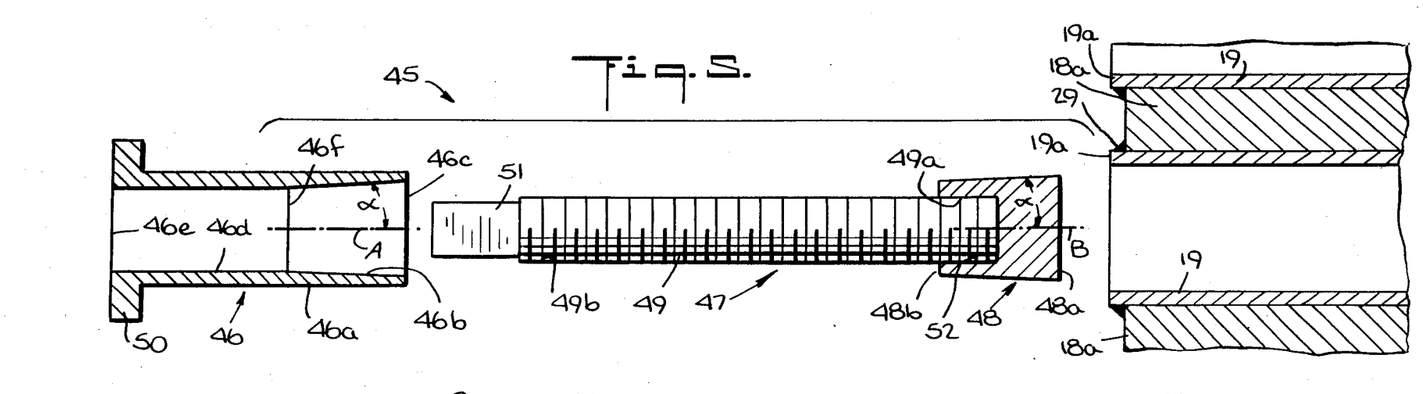
FIG. 5 is a fragmentary sectional view of one end of a similar defective tube, to illustrate a first step in plugging the tube in accordance with another embodiment of the invention.

Referring now to FIG. 5, the plugging apparatus 45 of the alternative embodiment of the invention includes a generally cylindrical sleeve member 46 and a comating plug member generally indicated by reference numeral 47. The plug member 47 has a tapered plug portion 48 which is threaded on to a plug stem 49, the latter having generally cylindrical shape.

As in the case of the previous embodiment, the sleeve member 46 has a generally cylindrical outer surface 46a, and an inner wall which includes a tapered length portion 46b extending inwardly from the open end 46c, and a straight cylindrical portion 46d which extends inwardly from the opposite open end 46e to the line of conjunction 46f with the tapered length portion 46b. The sleeve member 46 also includes an outwardly projecting peripheral flange or shoulder 50. However, the direction of taper of the tapered length portion 46b is opposite to that of the previously described sleeve member, being narrow towards the outer end 46e of the sleeve member, but the angle $\alpha$ of its taper is the same, i.e., 1 to 20 with reference to its longitudinal axis A.

As an example of the sizing of the elements of the modified embodiment being described, it will again be assumed that the tube 19 (FIG. 5) to be plugged is a nominally $\frac{5}{8}$" heat exchanger tube. Thus, the outside diameter 46a of the sleeve member 46 should again be 0.445" which will expand to approximately 0.475" in diameter when the plug is seated. This diameter provides about 0.015" clearance therearound for weld material etc. which the sleeve member is intended to bypass. The length of the interior tapered length portion 46b is $\frac{1}{2}$", its diameter being 0.435" at the sleeve member end 46c. The diameter of the straight cylindrical interior length portion 46d is 0.385", and its length is $\frac{3}{4}$". The diameter of the exterior shoulder 50 is $\frac{5}{8}$". The preferred material for the sleeve member 46 is Cosmic stainless steel, which is a stainless steel corresponding to AI- SI304. Alternatively, the sleeve member 46 may be of a 90/10 copper-nickel alloy. The comating tapered plug 48 of the plug member 47 is preferably of a harder material, such as Versalloy, having a Rockwell "C" hardness of from 25 to 30. Its 1 to 20 taper angle, as measured from its imaginary axis B, extends from a diameter of 0.445" at its inwardly facing end 48a to a diameter of 0.395" at its outer, or narrower end 48b. The length of the plug 48 is ½".

The plug stem 49 has straight cylindrical shape, its diameter being ⅜". It is threaded along its length using any standard thread, such as 24 threads per inch, and its inner end 49a is received in a corresponding threaded bore 52 of the plug 48, as illustrated in FIG. 5. The depth of the bore 52 is about ¼". At its outer end the stem member 49 is provided with a ⅜" long square shape, measuring ¼" on each face, to be used as a grip for a wrench, to hold the stem 49 and plug 48 from turning as the plug is tightened in place, as will be described. The overall length of the plug stem 49 is 2⅜", and it may be made of the Versalloy material from which the plug 48 is made. As will be noted from a comparison of FIGS. 5 and 6, the plug stem 49 is slidably received within the bore of the sleeve member 46 when the apparatus is readied for placement, the plug 48 being tightened on the end 49a of the stem 49.

Figure 6:
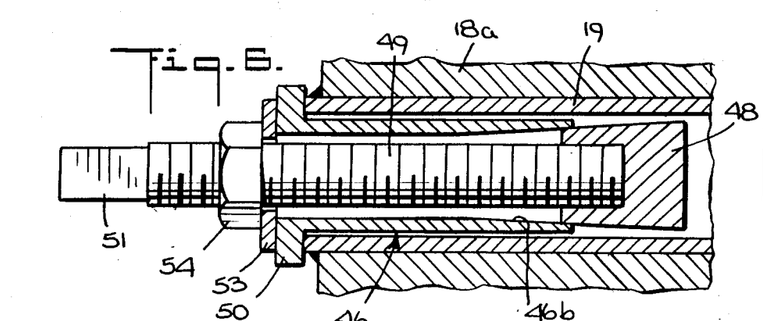
FIG. 6 is a similar view of the tube in FIG. 5, as it would appear at an intermediate stage of the tube plugging procedure.
Figure 7:
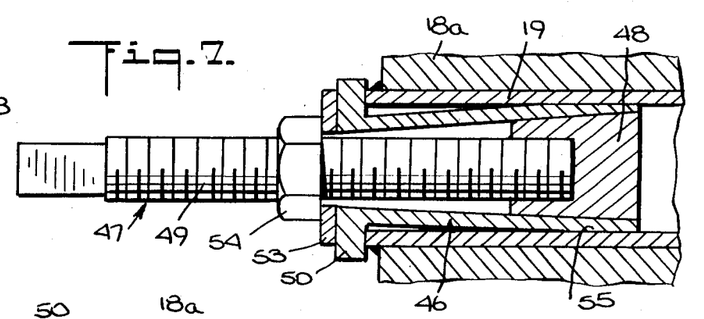
FIG. 7 is a similar view of the tube in FIG. 5, as it would appear as the seal is formed.
Figure 8:
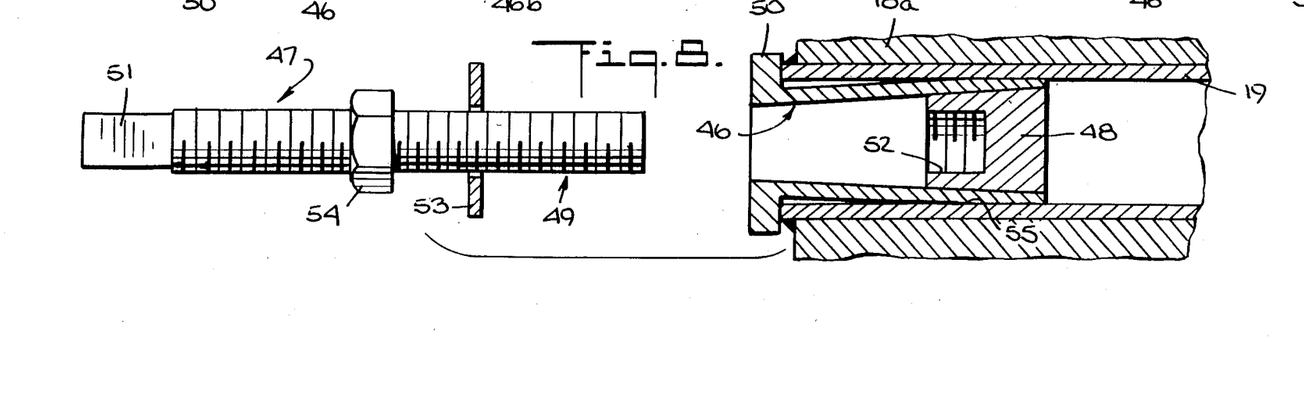
FIG. 8 is a similar view of the tube in FIG. 5, showing the tube plug in place.

Referring now to FIG. 6, the thus assembled sleeve member 46 and plug member 47 are provided with a slidable flat washer 53 and a threaded nut 54 for tightening the plug within the tube end. The nut 54 is threadedly received on the threaded outer end 49b of the stem 49, and bears against the washer 53 which, in turn, bears against the shoulder 50 of the sleeve member 46. Thus assembled, the plugging apparatus is placed within the tube end 19a. Using wrenches (not shown), a first wrench for holding on to the square gripping end 51 to prevent its turning and a second for turning the nut 54, the nut 54 is tightened to thread and thus draw the plug stem 49 back out from the tube end 19a, to force the tapered plug 48 against the interior tapered length portion 46b of the sleeve member 46 to deform and radially expand the sleeve member 46 against the interior of the tube 19, as seen in FIG. 7. It is believed that, due to the substantial length of the sleeve member portion 46 including its tapered and straight length portions 46b and 46d disposed in front of the plug member end 48b (FIG. 5) when the plug is initially inserted as shown in FIG. 6, there is a significant amount of deformable metal material in front of the plug whose plastic deformation and resulting elastic contraction therebehind produces a peripherally extending "swell" of the deformable sleeve member material at about the midsection of the fully formed plug seal 55. This "swelling" presses into the tube wall 19, and not only contributes to the tightness of the seal along its entire length, but also "locks" the plug in place so that it cannot move in either direction within the tube, and therefore cannot fall out. Thus, a leak-tight seal 55 is formed along a length of the inner end of the sleeve member 46, between the sleeve member and the tube 19, at a location spaced inwardly from the tube end 19a so as to avoid weld splatter, tube distortions, etc. at or adjacent to the tube end 19a as might interfere with a proper seal. It will be noted from FIG. 7 that the extent of tightening and thus withdrawal of the plug member 47 is substantially equal to the length of the plug 48. Accordingly, the amount of stress being exerted on the adjacent tube sheet ligaments can be approximately determined, so that distortion of the ligaments can be avoided.

After the plug has been set as illustrated in FIG. 7, by turning in the opposite direction on the square gripping end 51 of the plug stem 49, the plug stem 49 can be removed from the bore 52 of the plug 48, and the plug stem 48, nut 54, and washer 53 are therefore reusable.

Figure 9:
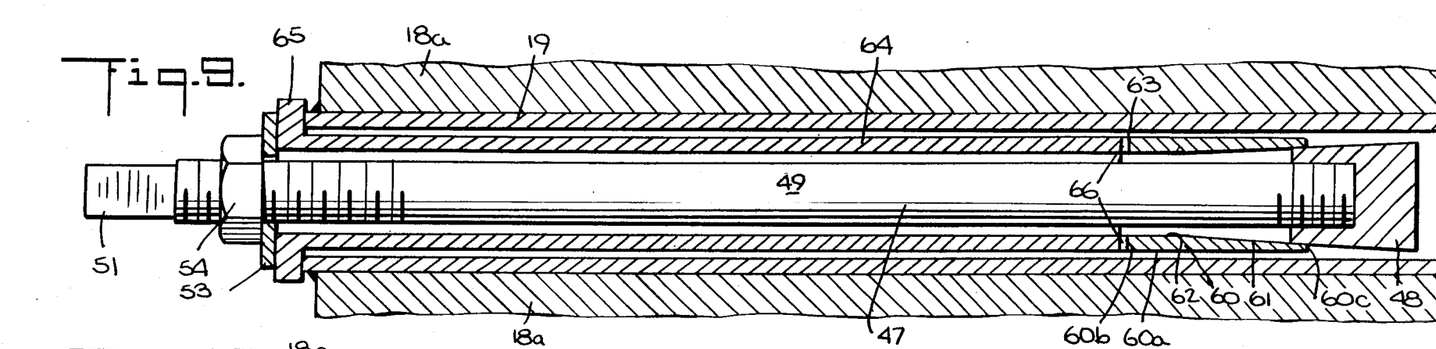
FIG. 9 is a fragmentary sectional view of a tube being plugged using still another embodiment of the invention.
Figure 10:
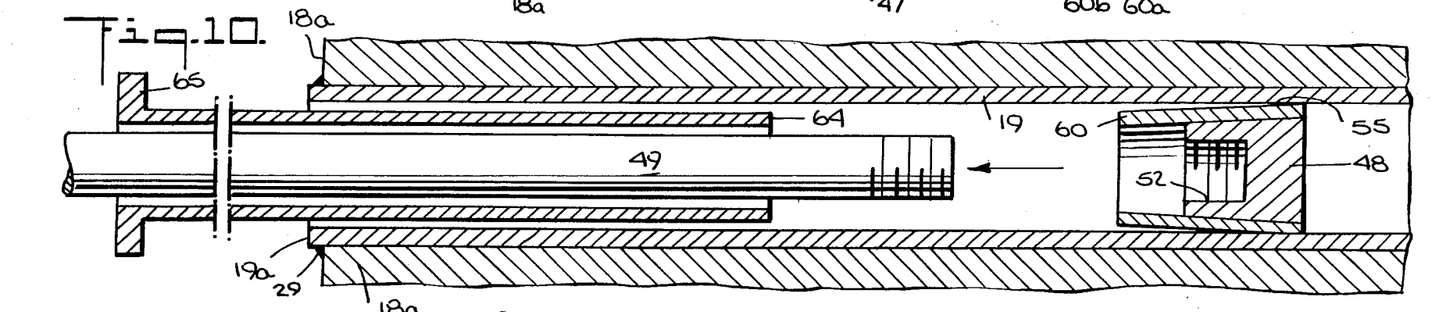
FIG. 10 is a similar fragmentary view of the tube in FIG. 8, but showing the plug fully sealed in place.

Referring now to FIGS. 9 and 10, it will be understood that the plug stem 49 may be made considerably longer to effect a seal at a location spaced a considerable distance within the tube away from its end 19a, if desired. In a modern steam generator the thickness of the tube sheet may be more than 20", and it may be desirable to place the plug at an interior location anywhere along the length of the tube within such thickness to avoid corrosion locations and other tube distortions at, or adjacent the tube end 19a.

When such is desired, a longer plug stem 49 is provided as shown, whereupon the plug 48 as previously described is threaded on its inner end, as seen in FIG. 9. However, in lieu of providing a sleeve member which is of similar length, as would be wasteful of material, the sleeve member 60 is made shorter, and is not provided with the aforementioned peripheral shoulder 50. Thus, its outer cylindrical surface 60a is straight throughout its entire length between its open ends 60b and 60c. However, the sleeve member 60 is provided with both a tapered interior length portion 61 and a straight cylindrical interior length portion 62, as in the previously described embodiment of FIGS. 5-8. In addition, the outer end 60b is provided with a diametrally extending slot 63, for a purpose as will be described.

The sleeve member 60 is placed on the extended plug stem 49 and one or more cylindrical locating sleeves 64 are placed thereon behind the sleeve member 60, the outermost locating sleeve 64 having a peripheral shoulder 65 similar to the shoulder 50 in the previously described embodiment. At its inner end, (and between adjacent locating sleeves if there are more than one), the locating sleeve 64 has diametrally extending splines 66 which engage the slots 63 in the sleeve member 60, to prevent rotation of the sleeve 60 when the plug is being formed.

As in the previously described embodiment, and as seen in FIG. 9, when positioned within the tube 19 the sleeve 60, locating sleeve 64, and plug member 47 are positioned against the tube end 19a, a nut 54 and flat washer 53 being provided to seat against the shoulder 65, in the manner described in connection with the embodiment shown in FIGS. 5-8.

The plug seal is formed in the same manner as was the plug seal described in connection with FIGS. 5-8. That is, a wrench is used to hold the square end 51, and thus the plug stem 49 against rotation, and a second wrench is used to tighten the nut 54 so that the threaded plug stem is threaded outwardly, thus to draw the plug 48 into the sleeve member 60 to radially expand its tapered end portion 61. The leak-tight seal 55 formed by the radial deformation of the sleeve member 60 is illustrated in FIG. 10.

After the seal is formed, and as also illustrated in FIG. 10, the plug stem 49 may be disengaged from the plug 48 by turning the wrench grip 51 in the opposite direction. Thus, the plug stem 49, washer 53, and nut 54 are removed for reuse, as is the locating sleeve 64.

Figure 11:
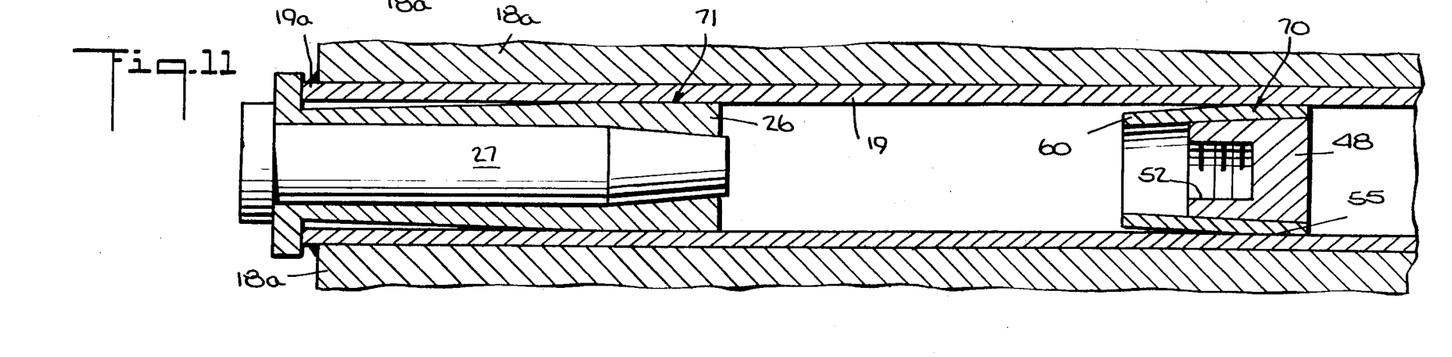
FIG. 11 is a fragmentary sectional view of a tube having two plugs therein in accordance with the invention.

FIG. 11 shows that, if desired, two leak-tight seals may be provided within the tube length passing through a relatively thick tube sheet. In such case, the innermost plug 70 would be formed first, using the apparatus described in connection with FIGS. 9 and 10, whereupon the second or outer plug 71 would be formed using the apparatus described in either of FIGS. 2–4 or 5–8. As shown in FIG. 11, the plug 71 is similar to that described in connection with FIGS. 2–4.

Thus has been described a plugging apparatus in several of its embodiments which achieves all of the objects of the invention.

What is claimed is:

1. Apparatus for plugging a heat exchanger tube, comprising an elongated, generally cylindrical sleeve member of deformable metal material and having opposite open ends, a straight and plainly cylindrical outer surface having a diameter which is nominally the same as the inner diameter of said tube so as to be slidably received therein and which is substantially the same throughout the length of said sleeve, and an interior surface comprising integrally formed tapered length and straight cylindrical length portions, said interior tapered length portion having a narrow end and a wide end and extending inwardly from one of said open ends of said sleeve member, and said interior straight cylindrical length portion extending from the other open end and conjoining with said tapered length portion at a location within the length of said sleeve member, and a plug member of hard metal and adapted for insertion into, and for deforming said sleeve member, said plug member having an exterior tapered length portion for comating engagement with said interior tapered length portion of said sleeve member, said plug tapered length portion having a narrow end and a wider end and the same angle of taper as said interior tapered length portion of said sleeve member, said plug narrow end having a diameter less than that of said wide end of said sleeve member interior tapered length portion and said plug wider end having a diameter greater than that of the narrow end of said tapered length portion of said sleeve member, and said interior tapered length portion of said sleeve member having its narrowing length extending a substantial distance beyond said narrow end of said plug tapered length portion when the exterior periphery of said narrow end of the latter first engages the interior periphery of said sleeve member during said insertion of said plug member into said sleeve member to deform the latter, whereby significant plastic deformation of said interior tapered length portion of said sleeve member which corresponds to the length of said plug within said tapered length portion and which extends said substantial distance occurs when the periphery of said wider end of said plug tapered length portion engages the periphery of said tapered length portion of said sleeve member when said plug member is forced into said sleeve member and said sleeve member is fully deformed.

2. Apparatus according to claim 1, wherein the taper angles of said sleeve member interior tapered length portion and of said plug member exterior tapered length portion are each provided by a taper ratio of substantially one-to-twenty (1:20) with reference to the longitudinal axis thereof.

3. Apparatus according to claim 2, wherein said other open end of said sleeve member has an exterior peripheral flange thereon for seating said sleeve member against an open end of said tube.

4. Apparatus according to claim 3, wherein said taper of said tapered length portion narrows towards said other open end of said sleeve member, and said plug member further comprises means for applying tension force to said plug member to press its said tapered length against said interior tapered length portion of said sleeve member to radially deform and seal said sleeve member within said tube.

5. Apparatus according to claim 3, wherein said taper of said tapered length portions narrows towards said one open end of said sleeve member, and said plug member comprises means including a straight length portion for projecting from said sleeve member other end for receiving hammer striking forces to press its said tapered length against said interior tapered length portion of said sleeve member to radially deform and seal said sleeve member within said tube.

6. In a heat exchanger having a tube sheet and a heat exchanger tube extending through the thickness of said tube sheet, said tube having an interior surface and an open end opening on one side of said tube sheet, the improvement comprising a tube plug within and sealing off said tube at a location spaced inwardly away from said tube open end, said tube plug comprising an elongated sleeve member of deformable metal material which, prior to said sealing, has a substantially cyclindrical exterior surface and an interior surface including integral elongated straight and tapered interior surface portions, and a solid plug member of hard metal material having an elongated and correspondingly tapered exterior surface disposed within said sleeve member, said plug member tapered exterior surface having the same angle of taper as said tapered interior surface portion of said sleeve member, said sleeve member exterior surface being enlarged inwardly from said tube open end by significant plastic deformation and pressed into sealing engagement against said tube interior surface inwardly from said tube open end said sleeve member surface being enlarged at the portion thereof which corresponds to said tapered interior surface portion which engages said tapered exterior surface of said plug merber, and said tapered plug exterior surface being pressed in comating sealing engagement along its length within said tapered interior surface portion of said sleeve merber.

7. The improvement according to claim 6, wherein said plug location is within the thickness of said tube sheet.

8. The improvement according to claim 6, wherein said comating sealing engagement between said tapered plug exterior surface and said tapered interior surface portion of said sleeve members has a taper ratio of substantially one-to-twenty (1:20) with reference to the longitudinal axis of said heat exchanger tube.

9. The method of plugging a tube of a heat exchanger from an open end of the tube which opens on one side of a tube sheet of the heat exchanger, comprising the steps of sliding a generally cylindrical sleeve member having adjoining cylindrical and tapered interior surface portions within said open end of the tube to position said tapered interior surface portion thereof at a location spaced inwardly away from said tube open end, the outer diameter of said sleeve member having a sliding fit with inner diameter of said tube and said sleeve member being of deformable metal material and said cylindrical interior surface portion being integral with and extending from said tapered interior surface portion towards said open end of the tube, providing a hard metal plug member having a tapered exterior surface that has a taper angle that is the same as the taper angle of said tapered interior surface portion of said sleeve member, placing said tapered exterior surface of said hard metal plug member against said tapered interior surface portion of said sleeve member, and applying axially directed force on said plug member from exteriorly of said tube and at a position at said one side of said tube sheet to press its said tapered exterior surface into said tapered interior surface portion of the sleeve member a substantial distance to cause significant plastic deformation of said sleeve member adjacent the forward end of said plug as it moves within said sleeve member, and to radially expand said sleeve member along a length thereof corresponding to said plug member tapered exterior surface engaged thereby and thereby provide sealing engagement between the interior surface of said tube and said exterior surface of said sleeve member substantially uniformly along said radially expanded length of the latter, and sealing engagement between said tapered interior surface portion of said sleeve member and said tapered exterior surface of said plug member substantially uniformly along substantially the length of the plug member surface which engages said tapered interior surface of said sleeve member.

10. The method according to claim 9, wherein said sleeve member has a peripherally projecting flange on one end thereof, and said sleeve member slides into said tube until said flange is against said tube open end, whereby said tapered interior surface portion of said sleeve member is so positioned, the tapers of said plug member tapered surface and of said tapered interior surface portion of said sleeve member narrowing in the direction away from said tube open end, and said axially directed force is applied by hammering on an end of said plug member which projects outwardly from said flanged end of said sleeve member.

11. The method according to claim 10, wherein said plug is formed within the thickness of said tube sheet.

* * * * *